(12) United States Patent
Kim et al.

(10) Patent No.: US 12,555,811 B2
(45) Date of Patent: Feb. 17, 2026

(54) POLYMER ELECTROLYTE MEMBRANE AND MEMBRANE ELECTRODE ASSEMBLY COMPRISING SAME

(71) Applicant: KOLON INDUSTRIES, INC., Seoul (KR)

(72) Inventors: Na Young Kim, Seoul (KR); Dong Hoon Lee, Seoul (KR); Eun Su Lee, Seoul (KR); Jung Hwa Park, Seoul (KR); Hye Song Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 17/779,014

(22) PCT Filed: Sep. 28, 2021

(86) PCT No.: PCT/KR2021/013273
§ 371 (c)(1),
(2) Date: May 23, 2022

(87) PCT Pub. No.: WO2022/071731
PCT Pub. Date: Apr. 7, 2022

(65) Prior Publication Data
US 2022/0416284 A1    Dec. 29, 2022

(30) Foreign Application Priority Data

Sep. 29, 2020    (KR) ........................ 10-2020-0127385
Sep. 27, 2021    (KR) ........................ 10-2021-0127495

(51) Int. Cl.
*H01M 8/1067*    (2016.01)
*H01M 8/1004*    (2016.01)

(52) U.S. Cl.
CPC ....... *H01M 8/1067* (2013.01); *H01M 8/1004* (2013.01); *H01M 2300/0082* (2013.01); *H01M 2300/0085* (2013.01)

(58) Field of Classification Search
CPC ............. H01M 8/1067; H01M 8/1004; H01M 8/1023; H01M 8/1039; H01M 8/1018;
(Continued)

(56) References Cited

U.S. PATENT DOCUMENTS

2011/0081594 A1    4/2011  Han et al.
2011/0200907 A1*   8/2011  Moon .................... H01B 1/122
                                                      429/480
2012/0058412 A1    3/2012  Harada

FOREIGN PATENT DOCUMENTS

CN    102047476 A    5/2011
JP    2000-080166 A  3/2000
(Continued)

OTHER PUBLICATIONS

Wu et al. "Aligned electrospun nanofibers as proton conductive channels through thickness of solufonated poly(phthalazinone ether sulfone ketone) proton exchange members" Jounral of Power Sources, 2017, 358, 134-141 (Year: 2017).*
(Continued)

*Primary Examiner* — Jonathan G Leong
*Assistant Examiner* — Drew C Newman
(74) *Attorney, Agent, or Firm* — Harvest IP Law, LLP

(57) ABSTRACT

The present disclosure relates to a polymer electrolyte membrane comprising a polymer membrane containing an ion conductor, and a plurality of composite fibers, wherein the composite fiber comprises a core portion continuously formed in the longitudinal direction of the composite fiber and a matrix portion surrounding the core portion, and the core portion contains an ion exchange functional group.

8 Claims, 3 Drawing Sheets

(58) Field of Classification Search
CPC ............. H01M 8/1048; H01M 8/1058; H01M 2300/0082; H01M 2300/0085
See application file for complete search history.

(56) References Cited

FOREIGN PATENT DOCUMENTS

| | | |
|---|---|---|
| JP | 2003-132910 A | 5/2003 |
| JP | 2009-032503 A | 2/2009 |
| JP | 2011-523982 A | 8/2011 |
| KR | 100716551 B1 | 5/2007 |
| KR | 1020090123818 A | 12/2009 |
| KR | 1020100106217 A | 10/2010 |
| KR | 1020110037709 A | 4/2011 |
| KR | 1020130050825 A | 5/2013 |
| KR | 1020130120113 A | 11/2013 |
| KR | 1020150086305 A | 7/2015 |
| WO | 2009-044766 A1 | 4/2009 |

OTHER PUBLICATIONS

English translation of Doi et al. (JP-2009032503-A). (Year: 2009).*
The JP Office Action, dated Aug. 2, 2023.
CN Office Action, dated Aug. 12, 2023.
Notice of Allowance, Japan Patent Office, Jan. 22, 2024.

* cited by examiner

POLYMER ELECTROLYTE MEMBRANE AND MEMBRANE ELECTRODE ASSEMBLY COMPRISING SAME

CROSS-REFERENCE TO RELATED APPLICATION

This application is the National Stage filing under 35 U.S.C.371 of International Application No. PCT/KR2021/013273, filed on Sep. 28, 2021, and claims priority to Korean Patent Application No. 10-2020-0127385, filed on Sep. 29, 2020; and Korean Patent Application No. 10-2021-0127495, filed on Sep. 27, 2021.

TECHNICAL FIELD

The present disclosure relates to a polymer electrolyte membrane, a method for manufacturing the same, and a membrane-electrode assembly comprising the same, and more particularly, to a polymer electrolyte membrane having excellent ionic conductivity performance while having excellent morphological stability, and a membrane-electrode assembly comprising the same.

BACKGROUND ART

Fuel cells are batteries provided with a power generation system that directly converts chemical reaction energy such as oxidation/reduction reaction of hydrogen and oxygen contained in hydrocarbon-based fuel materials such as methanol, ethanol, and natural gas into electrical energy, and are in the spotlight as a next-generation clean energy source that can replace fossil energy due to their eco-friendly characteristics with high energy efficiency and low pollutant emission.

Such fuel cells have the advantage of being able to output a wide range of outputs with a stack configuration by stacking of unit cells, and exhibit 4 to 10 times the energy density compared to small lithium batteries so that they are attracting attention as small and mobile portable power sources.

A stack that actually generates electricity in a fuel cell has a structure in which several to tens of unit cells composed of a membrane-electrode assembly (MEA) and a separator (also called a bipolar plate) are stacked. In general, the membrane-electrode assembly has a structure in which an anode or fuel electrode and a cathode or air electrode are respectively disposed at both sides thereof with the electrolyte membrane being between them.

Fuel cells may be divided into an alkaline electrolyte fuel cell, a polymer electrolyte membrane fuel cell (PEMFC), etc. depending on the state and type of electrolyte. The polymer electrolyte membrane fuel cell among them is in the spotlight as a portable, vehicle, and home power supply device due to its advantages such as a low operating temperature of less than 100° C., fast start-up and response characteristics, and excellent durability.

Typical examples of the polymer electrolyte membrane fuel cell may include a proton exchange membrane fuel cell (PEMFC) using hydrogen gas as a fuel and a direct methanol fuel cell (DMFC) using liquid methanol as a fuel.

To summarize the reaction that occurs in a polymer electrolyte membrane fuel cell, first, when a fuel such as hydrogen gas is supplied to the anode, hydrogen ions ($H^+$) and electrons ($e^-$) are generated by the oxidation reaction of hydrogen at the anode. The generated hydrogen ions are transferred to the cathode through the polymer electrolyte membrane, and the generated electrons are transferred to the cathode through an external circuit. Oxygen is supplied to the cathode, and oxygen is combined with hydrogen ions and electrons to produce water by the reduction reaction of oxygen.

Meanwhile, in order to realize the commercialization of the polymer electrolyte membrane fuel cell, there are still many technical barriers to be solved, and essential improvement factors include the realization of high performance, long life, and production cost reduction. The component that has the greatest influence on this is the membrane-electrode assembly, and among them, the polymer electrolyte membrane is one of the key factors that have the greatest influence on the performance and price of the membrane-electrode assembly.

Requirements of the polymer electrolyte membrane required for operation of the polymer electrolyte membrane fuel cell include high hydrogen ion conductivity, chemical stability, low fuel permeability, high mechanical strength, low moisture content, excellent dimensional stability, and the like. Conventional polymer electrolyte membranes tend to be difficult to normally exhibit high performance in a specific temperature and relative humidity environment, particularly in high temperature/low humidification conditions. Due to this, the polymer electrolyte membrane fuel cell to which the conventional polymer electrolyte membrane is applied is limited in its use range.

In order to simultaneously secure the performance, durability, and mechanical and chemical properties of such a polymer electrolyte membrane, the development of a reinforced composite membrane-type polymer electrolyte membrane to which a reinforcing material is applied has been progressed. However, when a reinforcing material is introduced to improve the mechanical durability of the electrolyte membrane, the resistance loss increases, and the ionic conductivity of the electrolyte membrane decreases so that, as a result, there is a disadvantage in that the performance of a fuel cell comprising the same may be decreased.

Meanwhile, the reinforced composite membrane may be manufactured by immersing a porous reinforcing material a porous reinforcing material in a dispersion solution in which an ion conductor is dispersed, or formed by additionally adding an ion conductor layer to one or both surfaces thereof. Since it does not contain a functional group capable of transferring hydrogen ions to the reinforcing material, there is a problem in that the reinforcing material itself acts as a resistance of the electrolyte membrane, thereby reducing the hydrogen ion transfer capability of the entire polymer electrolyte membrane.

Therefore, in order to commercialize the polymer electrolyte membrane, mechanical durability should be improved by increasing dimensional stability during wet drying along with high performance. To this end, it is required to secure the optimal structure of the reinforced composite membrane and to improve the ionic conductivity together.

DISCLOSURE

Technical Problem

An object of the present disclosure is to provide a polymer electrolyte membrane which improves physical and mechanical durabilities of the electrolyte membrane and has excellent ionic conductivity at the same time by having excellent morphological stability.

Another object of the present disclosure is to provide a membrane-electrode assembly comprising the polymer electrolyte membrane.

Another object of the present disclosure is to provide a fuel cell comprising the membrane-electrode assembly.

Technical Solution

An embodiment of the present disclosure provides a polymer electrolyte membrane comprising a polymer membrane containing an ion conductor, and a plurality of composite fibers, wherein the composite fiber comprises a core portion continuously formed in the longitudinal direction of the composite fiber and a matrix portion surrounding the core portion, and the core portion contains an ion exchange functional group.

The composite fiber may comprise an ion conductor containing an ion exchange functional group in the core portion, an ion exchange functional group located on the inner surface of the matrix portion, or a combination thereof.

The composite fiber may be oriented in the through-plane (TP) direction of the polymer membrane.

The composite fiber may include a thread shape, a fibrous shape, a needle shape, a wire shape, or a combination thereof.

The ion exchange functional group may include a sulfonic acid group, a carboxyl group, a boronic acid group, a phosphoric acid group, an imide group, a sulfonimide group, a sulfonamide group, a sulfonic acid fluoride group, or combinations thereof.

The composite fiber may have an average diameter of 1 nm to 10 μm.

The core portion of the composite fiber may have an average diameter that is in a range of 50% to 95% of the average diameter of the composite fiber.

The polymer electrolyte membrane may have a hydrogen ion conductivity of 0.02 S/cm to 0.2 S/cm at 80° C. and 50% relative humidity (RH).

The polymer electrolyte membrane may have a hydrogen ion conductivity of 0.1 S/cm to 1.0 S/cm at 80° C. and 95% relative humidity (RH).

Another embodiment of the present disclosure provides a membrane-electrode assembly comprising an anode electrode and a cathode electrode which are positioned opposite to each other, and the polymer electrolyte membrane which is positioned between the anode electrode and the cathode electrode.

Another embodiment of the present disclosure provides a fuel cell comprising the membrane-electrode assembly.

Advantageous Effects

The polymer electrolyte membrane of the present disclosure introduces a composite fiber imparted with ionic conductivity to the polymer membrane to have excellent morphological stability and improve mechanical durability of the electrolyte membrane at the same time, and enable a polymer electrolyte membrane having excellent ionic conductivity to be realized.

BEST MODE FOR CARRYING OUT THE INVENTION

Figure 1:
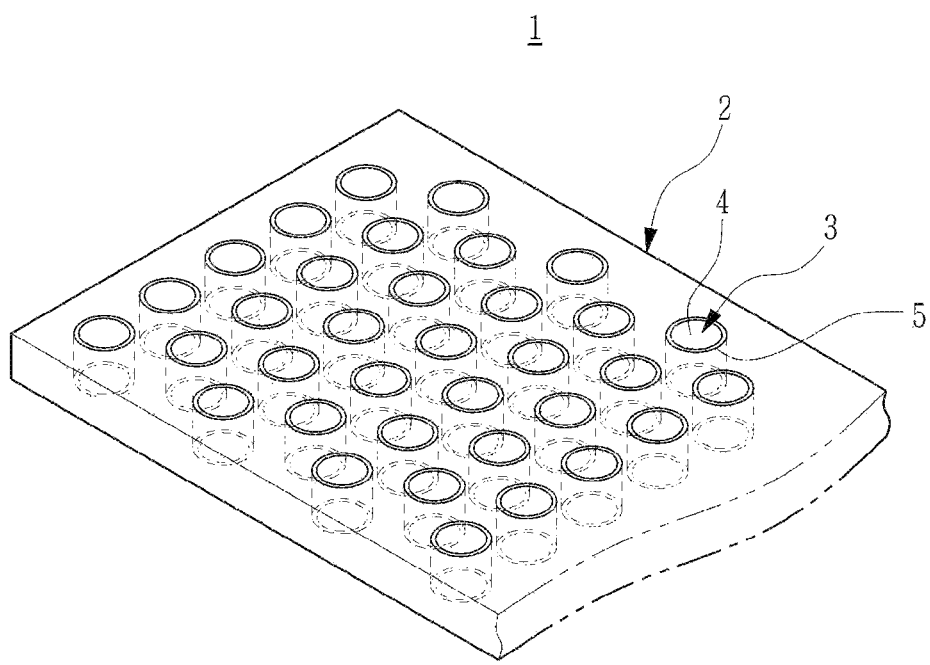
FIG. 1 is a schematic diagram schematically showing a polymer electrolyte membrane according to an embodiment of the present disclosure.

Hereinafter, embodiments of the present disclosure will be described in detail so that the present disclosure can be easily realized by those skilled in the art to which the present disclosure pertains. However, the present disclosure can be implemented in various different forms and is not limited to the embodiments described herein.

In order to clearly express the various layers and regions in the drawings, the thickness is enlarged and the same reference numerals are given to similar parts throughout the specification. When a part, such as a layer, film, region, plate, etc., is "on" other part, it includes not only the case where the part is "directly on" the other part, but also the case where another part is in the middle therebetween. Conversely, when a part is "just above" other part, it mean that there is no another part in the middle therebetween.

In order to clearly express various layers and regions in the drawings, the thicknesses are shown to be enlarged or reduced. Throughout the specification, the same reference numerals are assigned to similar parts. Throughout the specification, when a part, such as a layer, film, region, plate, or the like, is referred to as "on" or "above" other part, it includes not only the case where the part is directly on the other part but also the case where another part is in the middle therebetween.

Unless particularly mentioned in the present specification, the weight average molecular weight is measured using Agilent Technologies' 1200 series Gel Permeation Chromatography (GPC) after dissolving a powder sample in tetrahydrofuran (THF) (Shodex's LF-804 is used as a column, and Shodex's polystyrene is used as a standard sample).

Hereinafter, a polymer electrolyte membrane according to an embodiment will be described.

The present disclosure relates to a polymer electrolyte membrane capable of minimizing deterioration of the physical durability of an electrolyte membrane due to repetition of humidification and drying conditions in the driving process of a fuel cell and improving the ionic conductivity and performance of the electrolyte membrane, and a membrane-electrode assembly comprising the same.

The polymer electrolyte membrane according to an embodiment of the present disclosure comprises a polymer membrane containing an ion conductor, and a plurality of composite fibers, wherein the composite fiber comprises a core portion continuously formed in the longitudinal direction of the composite fiber and a matrix portion surrounding the core portion, and the core portion contains an ion exchange functional group.

Figure 2:
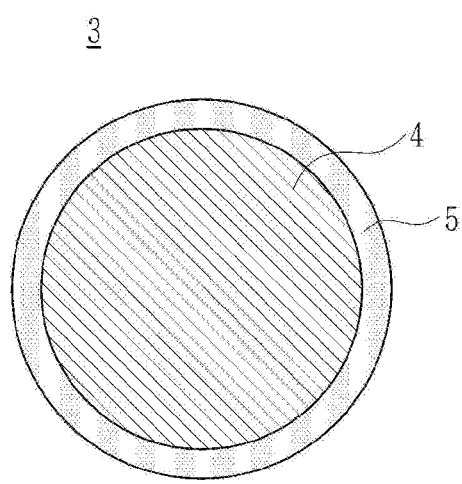
FIG. 2 shows a cross-section of a composite fiber contained in the polymer electrolyte membrane according to an embodiment of the present disclosure.

FIG. 1 is a schematic diagram showing a schematic configuration of the polymer electrolyte membrane, and FIG. 2 is a cross-sectional view schematically showing the composite fiber. When describing it by referring to FIGS. 1 and 2, the polymer electrolyte membrane 1 comprises a plurality of composite fibers 3 included in a polymer membrane 2 containing an ion conductor, and the composite fiber 3 comprises a core portion 4 which contains an ion exchange functional group and is continuously formed in the longitudinal direction of the composite fiber, and a matrix portion 5 surrounding the core portion 4.

The ion conductor (not shown) may be a cation conductor having a cation exchange functional group such as proton, or an anion conductor having an anion exchange functional group such as hydroxy ion, carbonate, or bicarbonate.

The cation exchange functional group may be any one selected from the group consisting of a sulfonic acid group, a carboxyl group, a boronic acid group, a phosphoric acid group, an imide group, a sulfonimide group, a sulfonamide group, a sulfonic acid fluoride group, and combinations thereof, and may generally be a sulfonic acid group or a carboxyl group.

Examples of the cation conductor may include: a fluoro-based polymer which contains the cation exchange functional group and contains fluorine in the main chain; a hydrocarbon-based polymer such as benzimidazole, polyamide, polyamideimide, polyimide, polyacetal, polyethylene, polypropylene, acrylic resin, polyester, polysulfone, polyether, polyetherimide, polyester, polyethersulfone, polyetherimide, polycarbonate, polystyrene, polyphenylene sulfide, polyether ether ketone, polyether ketone, poly(aryl ether sulfone), polyphosphazene, or polyphenylquinoxaline; a partially fluorinated polymer such as polystyrene-graft-ethylenetetrafluoroethylene copolymer or polystyrene-graft-polytetrafluoroethylene copolymer; sulfone imide; and the like.

More specifically, when the cation conductor is a hydrogen ion cation conductor, the polymers may contain a cation exchange group selected from the group consisting of a sulfonic acid group, a carboxylic acid group, a phosphoric acid group, a phosphonic acid group, and derivatives thereof in the side chain, and specific examples of the polymers may include: fluoro-based polymers including poly(perfluorosulfonic acid), poly(perfluorocarboxylic acid), a copolymer of sulfonic acid group-containing tetrafluoroethylene and fluorovinyl ether, defluorinated sulfurized polyether ketone, or mixtures thereof, and hydrocarbon-based polymers including sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof, but the present disclosure is not limited thereto.

The anion conductor is a polymer capable of transferring anions such as hydroxy ions, carbonate, or bicarbonate, and the anion conductor is commercially available in the form of a hydroxide or halide (generally chloride), and the anion conductor may be used in industrial water purification, metal separation or catalytic processes, or the like.

As the anion conductor, a polymer doped with a metal hydroxide may be generally used, and specifically, poly(ethersulfone), polystyrene, vinyl-based polymer, poly(vinyl chloride), poly(vinylidene fluoride), poly(tetrafluoroethylene), poly(benzimidazole), or poly(ethylene glycol) which is doped with a metal hydroxide may be used.

Specifically, the ion conductor may be a fluorinated polymer, specifically, a highly fluorinated polymer containing a highly fluorinated side chain. The term "highly fluorinated" means that at least 90% by mole of the total number of halogen and hydrogen atoms are substituted with fluorine atoms.

The highly fluorinated polymer contains a polymer skeleton and cyclic side chains attached to the skeleton, wherein the side chains may have the ion exchange functional group. For example, it may be copolymers of a first fluorinated vinyl monomer and a second fluorinated vinyl monomer having a sulfonic acid group.

The first fluorinated vinyl monomer may be tetrafluoroethylene (TFE), hexafluoropropylene, vinyl fluoride, vinylidene fluoride, trifluoroethylene, chlorotrifluoroethylene, perfluoro(alkyl vinyl ether), and mixtures thereof, and the second fluorinated vinyl monomer having a sulfonic acid group may be various fluorinated vinyl ethers having a sulfonic acid group.

The composite fiber 3 comprises a core portion 4 continuously formed in the longitudinal direction of the composite fiber and a matrix portion 5 surrounding the core portion 4, and the core portion 4 contains an ion exchange functional group.

The composite fiber 3 may form a core portion-matrix portion structure of a concentric circle shape around the cross-section of the composite fiber, but the core portion 4 does not necessarily have a circular cross-section. For example, it may comprise an elliptical core portion, and for example, it may comprise a core portion in the shape of a co-continuum. It comprises a core portion continuously formed in the longitudinal direction of the composite fiber and a matrix portion 5 surrounding the core portion.

In the case of a so-called reinforced composite membrane type polymer electrolyte membrane to which a reinforcing material is applied to simultaneously secure the durability, and mechanical and chemical properties of the polymer electrolyte membrane in order to realize a high-performance fuel cell, since the reinforcing material does not contain a functional group capable of transferring hydrogen ions, there is a problem in that the reinforcing material itself acts as a resistance of the electrolyte membrane, thereby lowering the concentration of hydrogen ions in the entire polymer electrolyte membrane.

The polymer electrolyte membrane 1 according to the embodiment contains a composite fiber 3 comprising a matrix portion 5 exhibiting high rigidity in the electrolyte membrane in order to secure the physical and mechanical properties of the electrolyte membrane, and introduces an ion exchange functional group into the core portion 4 of the composite fiber. Therefore, the ion conductivity of the entire polymer electrolyte membrane may be less reduced, and the impregnation properties (wetting) of the ion conductor in the manufacturing process of the polymer electrolyte membrane may also be improved.

The matrix portion 5 may comprise, as an example, a highly fluorinated polymer having excellent resistance to thermal and chemical decomposition, preferably perfluorine and a polymer. For example, the porous support may be a copolymer of polytetrafluoroethylene (PTFE) or tetrafluoroethylene and $CF_2=CFC_nF_{2n+1}$ (n is a real number of 1 to 5) or $CF_2=CFO-(CF_2CF(CF_3)O)_mCnF_{2n+1}$ (m is a real number of 0 to 15, and n is a real number of 1 to 15).

Further, the matrix portion 5 of the composite fiber 3 may comprise a hydrocarbon-based fiber forming polymer material, and it may include, for example, any one selected from the group consisting of: polyolefins such as polybutylene, polypropylene, and polyethylene; polyesters such as polyethylene terephthalate and polybutylene terephthalate; polyamides (nylon-6 and nylon-6,6); polyurethane; polybutene; polylactic acid; polyvinyl alcohol; polyphenylene sulfide; polysulfone; fluid crystalline polymers; polyethylene-co-vinyl acetate; polyacrylonitrile; cyclic polyolefins; polyoxymethylene; polyolefin-based thermoplastic elastomers; and combinations thereof, but the present disclosure is not limited thereto.

As another example, a hydrocarbon-based polymer which exhibits excellent chemical resistance and has hydrophobicity so that there is no risk of morphological deformation due to moisture in a high-humidity environment may be preferably used as the matrix portion 5 of the composite fiber 3. Specifically, the hydrocarbon-based polymer may include one which is selected from the group consisting of nylon, polyimide, polyaramid, polyetherimide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamideimide, polyethylene terephthalate, polyphenylene sulfide, polyethylene, polypropylene, copolymers thereof, and mixtures thereof, and may preferably include polyimide having more excellent heat resistance, chemical resistance, and morphological stability among them.

In an embodiment, the core portion 4 of the composite fiber may contain an ion conductor containing an ion exchange functional group, an ion exchange functional group which is located on the inner surface of the matrix portion 5, or a combination thereof. Specifically, the ion conductor containing the ion exchange functional group may be formed in a form which is impregnated into the core portion 4 of the composite fiber.

When the core portion 4 of the composite fiber comprises an ion conductor containing an ion exchange functional group, the ion conductor, as described above, may be a cation conductor having a cation exchange functional group such as proton or an anion conductor having an anion exchange functional group such as a hydroxy ion, carbonate, or bicarbonate, and the cation exchange functional group contained in the ion conductor may be any one selected from the group consisting of a sulfonic acid group, a carboxyl group, a boronic acid group, a phosphoric acid group, an imide group, a sulfonimide group, a sulfonamide group, a sulfonic acid fluoride group, and combinations thereof, and may generally be a sulfonic acid group or a carboxyl group. Specific examples of the cation conductor may include those of the same type as described above. The anion functional group contained in the ion conductor may be any one selected from the group consisting of a hydroxyl group, a halide group, and a combination thereof, and specific examples of the anion conductor may include those of the same type as described above.

In an embodiment, the composite fiber 3 may be oriented in the through-plane (TP) direction of the polymer electrolyte membrane. The term "orientation" refers to a state in which a plurality of composite fibers are preferentially arranged in the through-plane direction of the polymer electrolyte membrane, and it may be a concept including a case where the size of the angle between the longitudinal direction of the composite fiber and any one surface of the polymer electrolyte membrane is, for example, 45° to 90° as well as an arrangement in which the composite fibers are oriented perpendicular to the through-plane direction of the polymer electrolyte membrane. Further, it may be a concept including an arrangement together in which one end and the other end of the composite fiber are oriented to cross the thickness of the polymer electrolyte membrane, and it may mean that the composite fibers are not in a state that they are preferentially arranged in the in-plane (IP) direction of the polymer electrolyte membrane. Referring to FIG. 1, as described above, the composite fiber 3 containing an ion exchange functional group in the core portion 4 is oriented in the through-plane direction of the polymer electrolyte membrane 1, thereby providing an effective movement path of ions so that the ionic conductivity of the polymer electrolyte membrane is not reduced, resistance loss can be prevented, and a polymer electrolyte membrane excellent in mechanical strength and dry and wet dimensional stability of the electrolyte membrane can be realized. The composite fiber 3 may be oriented in the through-plane direction of the polymer electrolyte membrane 1 by using a method capable of arranging the composite fiber in one direction, such as electrostatic force, magnetic force, or the like.

In an embodiment, the composite fiber may have a shape including a thread shape, a fibrous shape, a needle shape, a wire shape, or combinations thereof, preferably a fibrous shape. However, as long as it is a composite fiber with a shape having a predetermined strength capable of improving the mechanical properties in the through-plane direction of the polymer electrolyte membrane, it is not particularly limited to the shape.

In an embodiment, the composite fiber 3 may have an average diameter of 1 nm to 10 μm, for example, 0.1 μm to 10 μm, for example, 1 μm to 10 μm, and for example, 1 μm to 5 μm. When the composite fiber 3 has an average diameter of less than 1 nm, it may not be easy to introduce an ion exchange functional group into the core portion of the composite fiber, and thus the ion transfer path in the through-plane direction of the polymer electrolyte membrane is reduced so that the ionic conductivity of the polymer electrolyte membrane may decrease. When the composite fiber 3 has an average diameter exceeding 10 μm, the physical and mechanical strength of the polymer electrolyte membrane may decrease, and thus durability and dimensional stability of the polymer electrolyte membrane may be deteriorated.

The average diameter of the core portion 4 of the composite fiber 3 may be in a range of 50% to 95%, specifically 75% to 95% of the average diameter of the composite fiber 3. When the average diameter of the core portion 4 is in a range of less than 50% of the average diameter of the composite fiber 3, the ion transfer functional group may not be sufficiently introduced into the composite fiber so that the ionic conductivity of the polymer electrolyte membrane may decrease. When the average diameter of the core portion 4 is in a range of exceeding 95% of the average diameter of the composite fiber 3, as the mechanical strength of the composite fiber itself decreases, the physical and mechanical strength of the polymer electrolyte membrane may decrease to lower dimensional stability.

The average diameter of the composite fiber 3 and the average diameter of the composite fiber core portion 4 may be measured using, for example, a scanning electron microscope (JSM6700F, JEOL).

In an embodiment, the polymer electrolyte membrane 1 may have a hydrogen ion conductivity of 0.02 S/cm to 0.2 S/cm at 80° C. and 50% relative humidity (RH), and specifically, the polymer electrolyte membrane 1 may have a hydrogen ion conductivity of 0.02 S/cm to 0.2 S/cm when the water uptake is 3% to 15%.

Further, in an embodiment, the polymer electrolyte membrane 1 may have a hydrogen ion conductivity of 0.1 S/cm to 1.0 S/cm at 80° C. and 95% relative humidity (RH), and specifically, the polymer electrolyte membrane 1 may have a hydrogen ion conductivity of 0.1 S/cm to 1.0 S/cm when the water uptake is 15% to 25%.

The polymer electrolyte membrane 1 contains an ion exchange functional group in the core portion 4 of the composite fiber 3 so that the formation of an ion transfer path in the through-plane direction of the electrolyte membrane is facilitated. As a result, it may exhibit a high ionic conductivity compared to a polymer electrolyte membrane having the same moisture content.

The hydrogen ion conductivity of the polymer electrolyte membrane 1 may be calculated by, for example, applying a platinum (Pt) catalyst to both surfaces of the polymer electrolyte membrane using a membrane test system (Scribner Associates, MTS 740), lifting a gas diffusion layer (GDL) to fasten it to the through-plane holder, and then measuring the resistance in the through-plane direction using the frequency response analyzer (Solatron) at conditions of a temperature of 80° C. and a relative humidity of 30% to 95%.

Further, the moisture content of the polymer electrolyte membrane may be measured at conditions of a temperature of 80° C. and a relative humidity of 30% to 95% using the magnetic suspension balance (Rubotherm).

Meanwhile, any one of the polymer membrane, the composite fiber, and a combination thereof may further comprise an antioxidant.

Since the reduction reaction of oxygen in a cathode electrode of a polymer electrolyte fuel cell proceeds via hydrogen peroxide ($H_2O_2$), hydrogen peroxide may be produced at the cathode electrode, or hydroxyl radical ($OH^-$) may be formed from the produced hydrogen peroxide. Further, as oxygen molecules permeate the polymer electrolyte membrane in an anode electrode of the polymer electrolyte fuel cell, the hydrogen peroxide or hydroxyl radical may be formed in the anode electrode as well. The formed hydrogen peroxide or hydroxyl radical causes deterioration of a polymer containing the sulfonic acid group contained in the polymer electrolyte membrane or the catalyst electrode.

Accordingly, the chemical durability of the polymer electrolyte membrane may be improved by comprising an antioxidant capable of decomposing the peroxide or radical to inhibit the formation of radical from the peroxide or decompose the formed radical, thereby preventing deterioration of the polymer electrolyte membrane or the catalyst electrode.

Any antioxidant may be used in the present disclosure without being particularly limited as the antioxidant capable of decomposing the peroxide or radical as long as it can rapidly decompose peroxides (especially hydrogen peroxide) or radical (especially hydroxyl radical) formed during operation of the polymer electrolyte fuel cell. Specific examples of the antioxidant capable of decomposing the peroxide or radical may include a transition metal capable of decomposing the peroxide or radical, a noble metal capable of decomposing the peroxide or radical, an ionic form thereof, a salt form thereof, or an oxide form thereof.

Specifically, the transition metal capable of decomposing the peroxide or radical may be any one selected from the group consisting of cerium (Ce), nickel (Ni), tungsten (W), cobalt (Co), chromium (Cr), zirconium (Zr), yttrium (Y), manganese (Mn), iron (Fe), titanium (Ti), vanadium (V), molybdenum (Mo), lanthanum (La), and neodymium (Nd).

Further, the noble metal capable of decomposing the peroxide or radical may be any one selected from the group consisting of silver (Au), platinum (Pt), ruthenium (Ru), palladium (Pd), and rhodium (Rh).

Further, the ion of the transition metal or the noble metal that is capable of decomposing the peroxide or radical may be any one selected from the group consisting of a cerium ion, a nickel ion, a tungsten ion, a cobalt ion, a chromium ion, a zirconium ion, an yttrium ion, a manganese ion, an iron ion, a titanium ion, a vanadium ion, a molybdenum ion, a lanthanum ion, a neodymium ion, a silver ion, a platinum ion, a ruthenium ion, a palladium ion, and a rhodium ions. Specifically, the cerium ion may be, for example, a cerium trivalent ion ($Ce^{3+}$) or a cerium tetravalent ion ($Ce^{4+}$).

Further, the oxide of the transition metal or the noble metal that is capable of decomposing the peroxide or radical may be any one selected from the group consisting of cerium oxide, nickel oxide, tungsten oxide, cobalt oxide, chromium oxide, zirconium oxide, yttrium oxide, manganese oxide, iron oxide, titanium oxide, vanadium oxide, molybdenum oxide, lanthanum oxide, and neodymium oxide.

Further, the salt of the transition metal or the noble metal that is capable of decomposing the peroxide or radical may be any one selected from the group consisting of carbonate, acetate, chloride salt, fluoride salt, sulfate, phosphate, tungstate, hydroxide salt, ammonium acetate, ammonium sulfate, and acetylacetonate salt of the transition metal or noble metal. Specific examples of the cerium salt may include cerium carbonate, cerium acetate, cerium chloride, cerium acetate, cerium sulfate, ammonium cerium(ii) acetate, ammonium cerium(iv) sulfate, etc., and examples of the organometallic complex salt may include cerium acetylacetonate, etc.

According to another embodiment of the present disclosure, there are provided a membrane-electrode assembly comprising the polymer electrolyte membrane, and a fuel cell.

Specifically, the membrane-electrode assembly comprises an anode electrode and a cathode electrode which are positioned to face each other, and the polymer electrolyte membrane which is positioned between the anode electrode and the cathode electrode.

Figure 3:
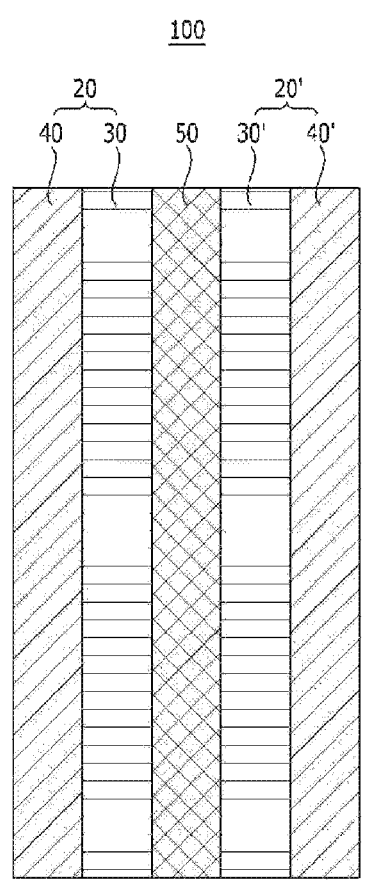
FIG. 3 is a cross-sectional view schematically showing a membrane-electrode assembly according to an embodiment of the present disclosure.

FIG. 3 is a cross-sectional view schematically showing a membrane-electrode assembly according to an embodiment of the present disclosure. Referring to FIG. 3, the membrane-electrode assembly 100 comprises the polymer electrolyte membrane 50 and the fuel cell electrodes 20 and 20' which are respectively disposed on both surfaces of the polymer electrolyte membrane 50. The electrodes 20 and 20' may comprise electrode base materials 40 and 40' and catalyst layers 30 and 30' formed on the surface of the electrode base materials 40 and 40', and may further comprise a microporous layer (not shown) containing conductive fine particles such as carbon powder and carbon black to facilitate material diffusion in the electrode base materials 40 and 40' between the electrode base materials 40 and 40' and the catalyst layers 30 and 30'.

In the membrane-electrode assembly 100, the electrode 20 which is disposed on one surface of the polymer electrolyte membrane 50 to cause an oxidation reaction for generating hydrogen ions and electrons from a fuel transferred to the catalyst layer 30 by passing through the electrode base material 40 is referred to as an anode electrode, and the electrode 20' which is disposed on the other surface of the polymer electrolyte membrane 50 to cause a reduction reaction for producing water from hydrogen ions received through the polymer electrolyte membrane 50 and an oxidizing agent transferred to the catalyst layer 30' by passing through the electrode base material 40' is referred to as a cathode electrode.

The catalyst layers 30 and 30' of the anode and cathode electrodes 20 and 20' contain a catalyst. Any catalyst may be used as the catalyst, as long as it participates in the reaction of the cell to be usable as a catalyst of a normal fuel cell. Specifically, a platinum-based metal may be preferably used.

The platinum-based metal may include one selected from the group consisting of platinum (Pt), palladium (Pd), ruthenium (Ru), iridium (Ir), osmium (Os), a platinum-M alloy (wherein M is one or more selected from the group consisting of palladium (Pd), ruthenium (Ru), iridium (Jr), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh)), a non-platinum alloy, and combinations thereof, and more preferably, combinations of two or more metals selected from the platinum-based catalyst metal group, but is not limited thereto, and any platinum-based catalyst metal usable in the art may be used without limitation.

Specific examples of the platinum alloy may include one selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, or mixtures of two or more thereof.

Further, the non-platinum alloy may include one selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and combinations thereof, or mixtures of two or more thereof.

Such a catalyst may be used as a catalyst itself (black), or may be used by being supported on a carrier.

The carrier may be selected from a carbon-based carrier, a porous inorganic oxide such as zirconia, alumina, titania, silica, ceria, or the like, zeolite. etc. The carbon-based carrier may be selected from graphite, super P, carbon fiber, carbon sheet, carbon black, Ketjen Black, Denka black, acetylene black, carbon nanotube (CNT), carbon sphere, carbon ribbon, fullerene, activated carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and one or more combinations thereof, but is not limited thereto, and any carrier usable in the art may be used without limitation.

The catalyst particles may be positioned on the surface of the carrier, or may penetrate into the carrier while filling the internal pores of the carrier.

When the noble metal supported on the carrier is used as a catalyst, a commercially available one may be used, or one prepared by supporting the noble metal on the carrier may also be used. Since the process of supporting the noble metal on the carrier is a content widely known in the art, although the detailed description is omitted in the present specification, it is a content that may be easily understood by those skilled in the art.

The catalyst particles may be contained in an amount of 20% by weight to 80% by weight based on the total weight of the catalyst electrodes 30 and 30'. When they are contained in an amount of less than 20% by weight, there may be a problem of decreased activity, and when they are contained in an amount of exceeding 80% by weight, the active area is reduced due to aggregation of the catalyst particles, and thus the catalytic activity may be adversely reduced.

Further, the catalyst electrodes 30 and 30' may comprise a binder in order to improve adhesion of the catalyst electrodes 30 and 30' and transfer hydrogen ions. It is preferable to use an ion conductor having ionic conductivity as the binder, and since the description of the ion conductor is the same as described above, a repetitive description will be omitted.

However, the ion conductor may be usable in the form of a single material or a mixture, and may optionally be used together with a non-conductive compound in order to further improve adhesion to the polymer electrolyte membrane 50. It is preferable to adjust the amount used to suit the purpose of use.

Examples of the non-conductive compound may include one or more selected from the group consisting of polytetrafluoroethylene (PTFE), tetrafluoroethylene-hexafluoropropylene copolymer (FEP), tetrafluoroethylene-perfluoroalkyl vinyl ether copolymer (PFA), ethylene/tetrafluoroethylene (ETFE), ethylene chlorotrifluoroethylene copolymer (ECTFE), polyvinylidene fluoride, polyvinylidene fluoride-hexafluoropropylene copolymer (PVdF-HFP), Dodecylbenzenesulfonic acid, and sorbitol.

The binder may be contained in an amount of 20% by weight to 80% by weight based on the total weight of the catalyst electrodes 30 and 30'. When the binder is contained in an amount of less than 20% by weight, the generated ions may not be transferred well, and when it is contained in an amount of exceeding 80% by weight, it is difficult to supply hydrogen or oxygen (air) due to insufficient pores, and the active area capable of being reacted may be reduced.

As the electrode base materials 40 and 40', a porous conductive base material may be used so that hydrogen or oxygen can be smoothly supplied. Typical examples thereof may include carbon paper, carbon cloth, carbon felt, or metal cloth (a porous film composed of a metal cloth of a fiber state or a metal film formed on the surface of a cloth formed of polymer fibers), but is not limited thereto. Further, it is preferable that the electrode base materials 40 and 40' include one which is water repellent treated with a fluorine-based resin since it is possible to prevent a decrease in reactant diffusion efficiency due to water produced when the fuel cell is driven. Examples of the fluorine-based resin may include polytetrafluoroethylene, polyvinylidene fluoride, polyhexafluoropropylene, polyperfluoroalkyl vinyl ether, polyperfluorosulfonylfluoride alkoxyvinyl ether, fluorinated ethylene propylene, polychlorotrifluoroethylene, or copolymers thereof.

Further, a microporous layer for enhancing the reactant diffusion effect in the electrode base materials 40 and 40' may be further comprised. The microporous layer may generally contain a conductive powder having a small particle size, for example, carbon powder, carbon black, acetylene black, activated carbon, carbon fiber, fullerene, carbon nanotube, carbon nanowire, carbon nanohorn, or carbon nanoring.

The microporous layer is prepared by coating the electrode base materials 40 and 40' with a composition comprising a conductive powder, a binder resin, and a solvent. Examples of the binder resin may preferably include polytetrafluoroethylene, polyvinylidene fluoride, polyhexafluoropropylene, polyperfluoroalkyl vinyl ether, polyperfluorosulfonyl fluoride, alkoxyvinyl ether, polyvinyl alcohol, cellulose acetate, or copolymers thereof. Example of the solvent may preferably include alcohol such as ethanol, isopropyl alcohol, n-propyl alcohol, butyl alcohol, or the like, water, dimethylacetamide, dimethyl sulfoxide, N-methylpyrrolidone, tetrahydrofuran, etc. Examples of the coating process may include a screen printing method, a spray coating method, or a coating method using a doctor blade depending on the viscosity of the composition, but is not limited thereto.

The membrane-electrode assembly 100 may be manufactured according to a typical method for manufacturing a membrane-electrode assembly for a fuel cell except that the polymer electrolyte membrane 50 according to the present disclosure is used as the polymer electrolyte membrane 50.

The fuel cell according to another embodiment of the present disclosure may comprise the membrane-electrode assembly 100.

Figure 4:
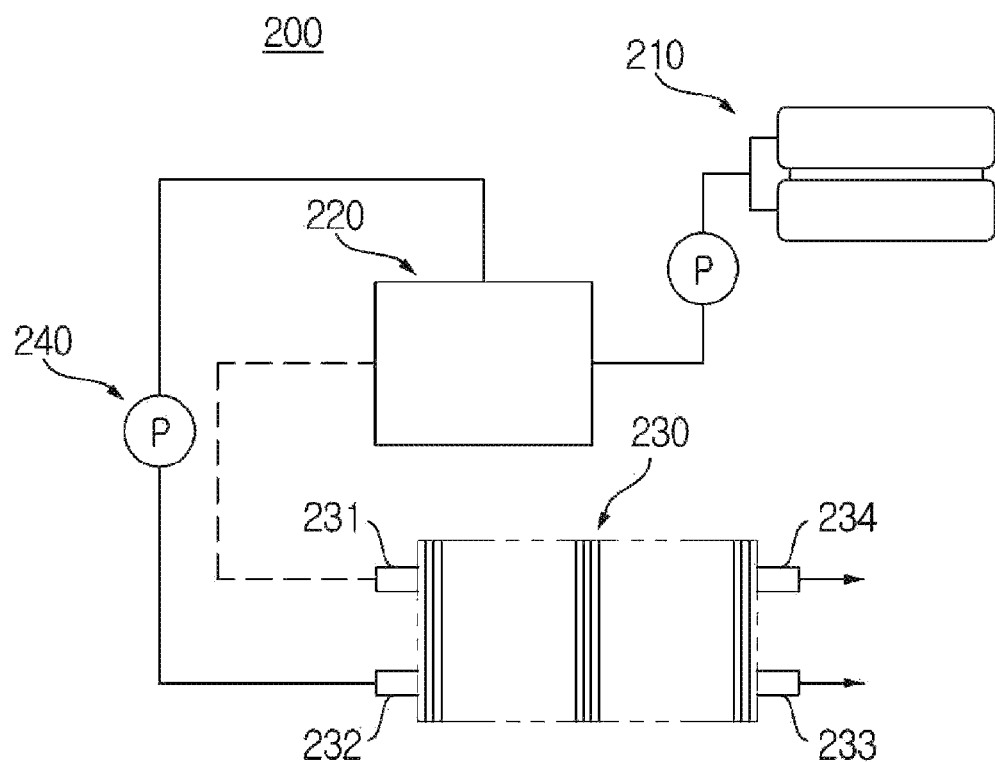
FIG. 4 is a schematic diagram illustrating the overall configuration of a fuel cell according to an embodiment of the present disclosure.

FIG. 4 is a schematic diagram illustrating the overall configuration of the fuel cell.

Referring to FIG. 4, the fuel cell 200 comprises a fuel supply unit 210 for supplying a mixed fuel in which fuel and water are mixed, a reforming unit 220 for generating a reformed gas containing hydrogen gas by reforming the mixed fuel, a stack 230 in which the reformed gas containing hydrogen gas supplied from the reforming unit 220 causes an electrochemical reaction with an oxidizing agent to generate electrical energy, and an oxidizing agent supply unit 240 for supplying the oxidizing agent to the reforming unit 220 and the stack 230.

The stack 230 includes a plurality of unit cells for generating electrical energy by inducing an oxidation/reduction reaction of the reformed gas containing hydrogen gas supplied from the reforming unit 220 and the oxidizing agent supplied from the oxidizing agent supply unit 240.

Each unit cell refers to a unit cell that generates electricity, and comprises the membrane-electrode assembly for oxidizing/reducing oxygen in the hydrogen gas-containing reformed gas and the oxidizing agent and a separation plate (also called a bipolar plate, hereinafter referred to as a 'separation plate') for supplying the hydrogen gas-containing reformed gas and the oxidizing agent to the membrane-electrode assembly. The separation plate is disposed on both sides of the membrane-electrode assembly which is positioned in the center therebetween. In this case, the separation plates respectively positioned on the outermost sides of the stack are particularly referred to as end plates.

The end plate of the separation plate includes a first pipe-shaped supply pipe 231 for injecting the reformed gas containing hydrogen gas supplied from the reforming unit 220 and a second pipe-shaped supply pipe 232 for injecting oxygen gas, and the other end plate includes a first discharge pipe 233 for discharging a reformed gas containing hydrogen gas finally unreacted in the plurality of unit cells and remained to the outside and a second discharge pipe 234 for discharging an oxidizing agent finally unreacted in the unit cells and remained to the outside.

Since the separator, the fuel supply unit, and the oxidizing agent supply unit constituting the electricity generation unit are used in a typical fuel cell except that the membrane-electrode assembly 100 according to an embodiment of the present disclosure is used in the fuel cell, a detailed description will be omitted in the present specification.

MODES FOR CARRYING OUT THE INVENTION

Hereinafter, Examples of the present disclosure will be described in detail so that the present disclosure can be easily practiced by those skilled in the art to which the present disclosure pertains. However, the present disclosure may be embodied in several different forms and is not limited to the Examples described herein.

Example: Manufacturing of Polymer Electrolyte Membrane

Example 1

After impregnating a 10 μm-thick nonwoven fabric (porosity 70%, the orientation of the hollow fiber was random) manufactured of a polyvinylidene fluoride (PVDF) hollow fiber with an ionomer dispersion (Nafion D2021), it was dried at 80° C. for 1 hour and heat-treated at 150° C. for 30 minutes to manufacture a polymer electrolyte membrane, which was a reinforced composite membrane with a thickness of 20 μm.

The polyvinylidene fluoride (PVDF) hollow fiber included one that was a composite fiber in which a perfluorosulfonic acid (PFSA) ionomer, an ion conductor, was introduced into a core portion corresponding to 75% of an average diameter thereof.

Example 2

A polymer electrolyte membrane was manufactured in the same manner as in Example 1 except that a composite fiber in which a perfluorosulfonic acid (PFSA) ionomer, an ion conductor, was introduced into a core portion corresponding to 85% of an average diameter of the polyvinylidene fluoride (PVDF) hollow fiber was used in Example 1.

Example 3

A polymer electrolyte membrane was manufactured in the same manner as in Example 1 except that a composite fiber in which a perfluorosulfonic acid (PFSA) ionomer, an ion conductor, was introduced into a core portion corresponding to 95% of an average diameter of the polyvinylidene fluoride (PVDF) hollow fiber was used in Example 1.

Example 4

After a 10 μm-thick nonwoven fabric (porosity 75%) manufactured by needle-punching a polyvinylidene fluoride (PVDF) hollow fiber to make its orientation uniform was impregnated with the ionomer dispersion (Nafion D2021), it was dried at 80° C. for 1 hour and heat-treated at 150° C. for 30 minutes to manufacture a polymer electrolyte membrane, which was a reinforced composite membrane with a thickness of 20 μm.

The polyvinylidene fluoride (PVDF) hollow fiber included one that was a composite fiber in which a perfluorosulfonic acid (PFSA) ionomer, an ion conductor, was introduced into a core portion corresponding to 75% of an average diameter thereof.

Example 5

A polymer electrolyte membrane was manufactured in the same manner as in Example 4 except that a composite fiber in which a perfluorosulfonic acid (PFSA) ionomer, an ion conductor, was introduced into a core portion corresponding to 85% of an average diameter of the polyvinylidene fluoride (PVDF) hollow fiber was used in Example 4.

Example 6

A polymer electrolyte membrane was manufactured in the same manner as in Example 4 except that a composite fiber in which a perfluorosulfonic acid (PFSA) ionomer, an ion conductor, was introduced into a core portion corresponding to 95% of an average diameter of the polyvinylidene fluoride (PVDF) hollow fiber was used in Example 4.

Comparative Example 1

After the ionomer dispersion (Nafion D2021) was applied to a polyethylene film which was a release film, it was dried at 80° C. for 1 hour and heat-treated at 150° C. for 30 minutes.

The dried polymer membrane was detached from the release film to manufacture a polymer electrolyte membrane having a thickness of 20 μm.

Comparative Example 2

After impregnating a 10 μm-thick polyvinylidene fluoride (PVDF) nonwoven fabric (porosity 70%) with the ionomer dispersion (Nafion D2021), it was dried at 80° C. for 1 hour and heat-treated at 150° C. for 30 minutes to manufacture a polymer electrolyte membrane, which was a reinforced composite membrane with a thickness of 20 μm.

Comparative Example 3

After impregnating a 10 μm-thick nonwoven fabric (porosity 70%, the orientation of the hollow fiber was random) manufactured of a polyvinylidene fluoride (PVDF) hollow fiber with the ionomer dispersion (Nafion D2021), it was dried at 80° C. for 1 hour and heat-treated at 150° C. for 30 minutes to manufacture a polymer electrolyte membrane, which was a reinforced composite membrane with a thickness of 20 μm.

Comparative Example 4

After a 10 μm-thick nonwoven fabric (porosity 70%) manufactured by needle-punching a polyvinylidene fluoride (PVDF) hollow fiber to make its orientation uniform was impregnated with the ionomer dispersion (Nafion D2021), it was dried at 80° C. for 1 hour and heat-treated at 150° C. for 30 minutes to manufacture a polymer electrolyte membrane, which was a reinforced composite membrane with a thickness of 20 μm.

Evaluation Example: Measurement of Hydrogen Ion Conductivities of Polymer Electrolyte Membranes For each of the polymer electrolyte membranes manufactured in Examples 1 to 6 and Comparative Examples 1 to 4 above, the hydrogen ion conductivity in the membrane through-plane direction was measured.

The hydrogen ion conductivity in the through-plane direction of the polymer electrolyte membrane was measured using a membrane test system (Scribner Associates, MTS 740). Specifically, membrane resistance (R) (Ω) was obtained by measuring a difference in AC potentials occurring within a sample (10 mm×30 mm) of each of the polymer electrolyte membranes manufactured in Examples 1 to 6 and Comparative Examples 1 to 4 above while applying AC current to both surfaces of the sample under 80° C. and 50% relative humidity (RH) condition and 80° C. and 95% relative humidity (RH) condition. Subsequently, the ionic conductivity values in the through-plane direction of the polymer electrolyte membranes were calculated using Equation 1 below, and the results are shown in Table 1 below.

$$\sigma = L/[R \times A] \quad [\text{Equation 1}]$$

(provided that, here, $\sigma$ is the ionic conductivity (S/cm) in the through-plane direction, L is the distance (cm) between electrodes, R is the membrane resistance (Ω), and A is the effective area (cm$^2$) of the membrane)

TABLE 1

| | Hydrogen ion conductivity (S/cm) | | | | | | | | | |
|---|---|---|---|---|---|---|---|---|---|---|
| | Example 1 | Example 2 | Example 3 | Example 4 | Example 5 | Example 6 | Comparative Example 1 | Comparative Example 2 | Comparative Example 3 | Comparative Example 4 |
| 80° C., 50% (RH) | 0.023 | 0.028 | 0.032 | 0.025 | 0.031 | 0.036 | 0.041 | 0.012 | 0.021 | 0.023 |
| 80° C., 95% (RH) | 0.90 | 0.92 | 0.94 | 0.94 | 0.97 | 1.0 | 1.05 | 0.71 | 0.86 | 0.92 |

Referring to Table 1 above, it could be seen that the ionic conductivities of the polymer electrolyte membranes were prevented from being lowered as the composite fibers contained in the polymer electrolyte membranes contained ion exchange functional groups in the core portion through the fact that the hydrogen ion conductivities of the polymer electrolyte membranes according to Examples 1 to 6 were all exhibited to be higher than those the polymer electrolyte membranes according to Comparative Examples 2 to 4 at both 80° C. and 50% relative humidity (RH) condition and 80° C. and 95% relative humidity (RH) condition.

Further, through the fact that the hydrogen ion conductivities of the polymer electrolyte membranes according to Examples 4 to 6 in which the composite fibers in the polymer electrolyte membranes were uniformly oriented in the through-plane direction of the membranes through needle punching were higher than those of the polymer electrolyte membranes according to Examples 1 to 3 in which the composite fibers were randomly arranged, it was confirmed that the ionic conductivities of the polymer electrolyte membranes were not reduced and resistance loss could be prevented by orienting the composite fibers in the through-plane direction of the polymer electrolyte membranes, thereby providing an effective movement path for ions.

Hereinabove, preferred embodiments of the present disclosure have been described in detail, but the scope of the present disclosure is not limited thereto, and various changes or modified forms of those skilled in the art using a basic concept of the present disclosure defined in the following claims also fall within the scope of the present disclosure.

| Detailed Description of Main Elements | |
|---|---|
| 1: Polymer electrolyte membrane | |
| 2: Polymer membrane | 3: Composite fiber |
| 4: Core portion | 5: Matrix portion |
| 20, 20': Electrodes | |
| 30, 30': Catalyst layers | |
| 40, 40': Electrode base materials | |
| 50: Polymer electrolyte membrane | |
| 100: Membrane-electrode assembly | |
| 200: Fuel cell | |
| 210: Fuel supply unit | 220: Reforming unit |
| 230: Stack | 231: First supply pipe |
| 232: Second supply pipe | 233: First discharge pipe |
| 234: Second discharge pipe | 240: Oxidizing agent supply unit |

The invention claimed is:

1. A polymer electrolyte membrane comprising:
a polymer membrane containing a first ion conductor; and
a plurality of composite fibers,
wherein each of the plurality of composite fibers comprises a core portion continuously formed in the longitudinal direction of each of the plurality of composite fibers and a matrix portion surrounding the core portion, and the core portion contains a first ion exchange functional group,
wherein the core portion of each of the composite fibers has an average diameter that is in a range of 75% to 95% of the average diameter of each of the plurality of composite fibers,
wherein the plurality of composite fibers are oriented in a through-plane (TP) direction of the polymer membrane,
wherein the longitudinal direction of the plurality of composite fibers is a direction which crosses a thickness of the polymer electrolyte membrane,
wherein the matrix portion does not comprise an ion exchange functional group, and
wherein the matrix portion comprises any one selected from the group consisting of: polyvinylidene fluoride; polyolefin; polyester; polyamide; polyurethane; polylactic acid; polysulfone; polyacrylonitrile; polyoxymethylene; polyaniline; polyethylene oxide; styrene butadiene rubber; polyvinyl chloride; polyvinyl alcohol; polybenzoxazole; polybenzimidazole; polyphenylene sulfide; and combinations thereof.

2. The polymer electrolyte membrane of claim 1, wherein the plurality of composite fibers includes a thread shape, a fibrous shape, a needle shape, a wire shape, or a combination thereof.

3. The polymer electrolyte membrane of claim 1, wherein the first ion exchange functional group includes a sulfonic acid group, a carboxyl group, a boronic acid group, a phosphoric acid group, an imide group, a sulfonimide group, a sulfonamide group, a sulfonic acid fluoride group, or combinations thereof.

4. The polymer electrolyte membrane of claim 1, wherein each of the plurality of composite fibers has an average diameter of 1 nm to 10 μm.

5. The polymer electrolyte membrane of claim 1, wherein the polymer electrolyte membrane has a hydrogen ion conductivity of 0.02 S/cm to 0.2 S/cm at 80° C. and 50% relative humidity (RH).

6. The polymer electrolyte membrane of claim 1, wherein the polymer electrolyte membrane has a hydrogen ion conductivity of 0.1 S/cm to 1.0 S/cm at 80° C. and 95% relative humidity (RH).

7. A membrane-electrode assembly comprising:
an anode electrode and a cathode electrode which are positioned opposite to each other; and
the polymer electrolyte membrane according to claim 1 which is positioned between the anode electrode and the cathode electrode.

8. A fuel cell comprising the membrane-electrode assembly according to claim 7.

* * * * *